April 15, 1969 C. HAINES, JR., ET AL 3,438,853
PROCESS OF CURING HARDBOARD CONTAINING WOOD
FIBERS AND PORTLAND CEMENT
Filed Feb. 10, 1966
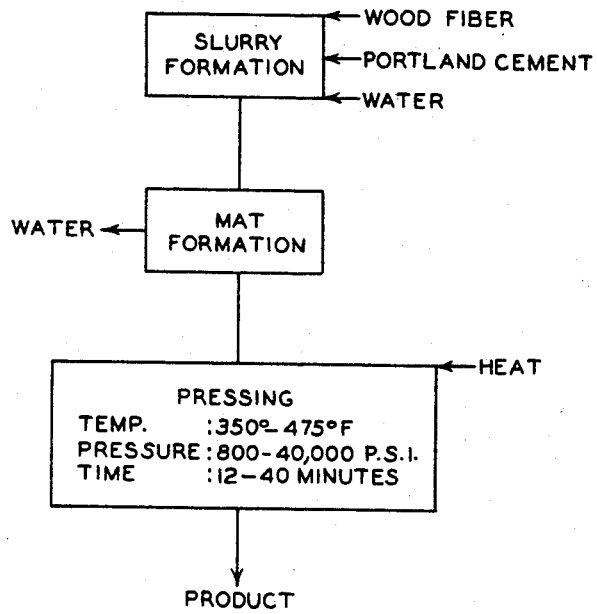
INVENTOR
CHARLES HAINES, JR.
ROY R. ROTHROCK
BY
ATTORNEY United States Patent Office 3,438,853
Patented Apr. 15, 1969

3,438,853
PROCESS OF CURING HARDBOARD CONTAINING WOOD FIBERS AND PORTLAND CEMENT
Charles Haines, Jr., Lancaster, and Roy R. Rothrock, Wrightsville, Pa., assignors to Armstrong Cork Company, Lancaster, Pa., a corporation of Pennsylvania
Filed Feb. 10, 1966, Ser. No. 526,479
Int. Cl. D21j 1/18
U.S. Cl. 162—164                        6 Claims

ABSTRACT OF THE DISCLOSURE

The process of curing a water-laid hardboard of wood fibers and portland cement by applying 350°–475° F. heat and high pressure for a period of time of about 12–40 minutes to a wet board containing 60%–80% water.

---

This invention relates generally to a process of making hardboard. More particularly, the invention relates to a process of making a hardboard having a portland cement binder. Still more particularly, the invention relates to a process of rapidly curing the uncured hardboard mat resulting from removing water from the slurry of wood fibers and portland cement.

Although it is known to utilize a portland cement as a binder for wood fiber products, little has been done to develop such a product. The curing of the portland cement binder on a wood fiber product has been time-consuming or unwieldy or both in that portland cement takes at least several days to cure under ambient conditions, and almost one day to cure under the usual conditions of autoclaving. Furthermore the wood fiber products bonded with the portland cement, while inexpensive, have not had as good properties as wood fiber products bonded with the more usual synthetic or natural resins or rubbers. There is, therefore, a need for a process of quickly and economically curing a wood fiber product bonded with portland cement which will produce an inexpensive but strong product having the density normally found in hardboard and semi-hardboards.

It is the primary object of the present invention to supply such a process. It is a further object of the present invention to supply a process whereby a wet mat of wood fibers having portland cement distributed therethrough as a binder may be quickly and economically cured to form an excellent hardboard.

These objects are achieved in a surprisingly simple and effective manner. The process contemplates curing the wet mat of wood fibers and portland cement by heating the mat to a temperature in the range of about 350°–475° F. while pressing the mat to a pressure in the range of about 800–40,000 pounds per square inch, and maintaining the temperature and pressure ranges for a period of time of about 12–40 minutes.

Any of the usual wood fibers may be used in forming the slurry from which the hardboard is ultimately made. Such woods include willow, various pines, many of the hardwoods such as maple, oak, and other suitable woods. The logs may be barked and chipped, and the chips subjected to a steam treatment or a cold caustic treatment as desired. If these relatively minor pretreatments are used, little or no mechanical refining will be required beyond converting the treated chips into fibrous form. However, mechanical refining may be used to place the pulp in condition for suitable mat formation; drainage time or freeness may readily be controlled. Too much refining should be avoided since the drainage time of the mat on a wire or in a form becomes too high. The wood fiber slurry will generally have a consistency in the range of 0.5%–5%, but will preferably be about 3%.

The portland cement may be added as such directly to the slurry or it may be formed into a slurry separately and then added to the wood fiber slurry. The amount of portland cement to be added will be in the range of 5%–25% by weight of the finished hardboard, and preferably will be in the range 10%–15% by weight. Agitation of the slurry should be carried out once the portland cement is added in order to maintain the portland cement evenly distributed throughout the aqueous slurry.

Although the hardboard may be made directly from these two ingredients, it is sometimes desirable to add one or more additional ingredients to the slurry at this stage. Small amounts of synthetic rubber latices, on the order of 0.5%–4% by weight latex based on the weight of the fibers and cement may be added. The primary purpose of the synthetic rubber latex addition at this point is to insure that all the portland cement is removed from the white water during formation of the mat in a mold or on a wire. The rubber also imparts some additional and desirable water resistance to the finished product. These synthetic rubber latices may be any of the known latexes used in the beater saturation processes such as polychloroprene latexes, butadiene-styrene copolymer latexes, butadiene-acrylonitrile copolymer latices, acrylonitrile-butadiene-styrene copolymer latices, and the like. In view of the relatively small amount of rubber added, a suitable latex will frequently be chosen on the basis of its cost, the more economical being the most likely to be chosen. Synthetic resin latices such as the acrylic latices may be added, but cost will normally be prohibitive.

In addition to a synthetic rubber latex or a resinous latex, there may also be added any of the resins in the form of their dispersions customarily used in connection with the bonding of wood fibers. Although the resins in such dispersions may be in the cured state, in view of the heat to be subsequently applied to the wood fiber mat, curable resins are preferred. These may be hydrocarbon resins, phenol-formaldehyde resins, and the like. Thermoplastic resin dispersions may be added such as latices of poly(vinyl chloride), poly(vinyl acetate), and vinyl chloride-vinyl acetate copolymers. It will be appreciated that the properties of the finished board may be adjusted to some extent by the addition of such thermosetting or thermoplastic resins.

A commercially available, inexpensive, extracted pine wood pitch sold under the name "Vinsol" may be added to the slurry in an amount of about 2%–10% by weight of the finished product. The addition of such resin improves the strength of the board at relatively low cost.

Any of the aids used in coating fibers with binders may be utilized. For example, the alum-ammonia process may be used in which the fibers are pretreated with papermaker's alum followed by the addition of a stoichiometric amount of ammonium hydroxide to form aluminum hydroxide. This process will aid in depositing any synthetic rubber or resin on the wood fibers. If the mat is to be formed from nothing but the wood fibers and portland cement, no such processes are normally required.

The finished slurry is poured into a mold and vacuum drained or it may be free drained in a mold or on a wire to form the wet mat. A fiberboard sheet mold may constitute the mold. Drainage will normally be carried out so that the amount of water remaining in the wet mat will be in the range of about 60%–80%. When sufficient water has been drained from the mat, it is then ready for the curing step which constitutes the heart of the present process.

The mat may be placed between screens and hot pressed in any manner which will produce the requisite temperatures and pressures for a relatively quick cure of the cement binder. The press platens may be heated electrically since it is impractical to obtain with steam the relatively very high curing temperatures called for by the present process. Platen temperatures should be such to heat the mat in the range of about 350°–475° F., and preferably in the range 400°–450° F. The platen temperatures will be even higher than these temperatures, but they should not be so high as to bring about charring of the wood fiber on the surface of the board. Charring of the wood fiber may begin to occur with platen temperatures above about 550° F. depending to some extent on the residence time.

The pressures to be used will be in the range of about 800–40,000 pounds per square inch, a more preferable range being 20,000–30,000 pounds per square inch. The gages on presses often read in total pressure, the pressure per unit area being arrived at by dividing the total pressure of the press by the surface area of the board being pressed.

The most usual thickness of the final hardboard will be about ½ inch, although the board may range in thickness from about ¼ inch to about ¾ inch. The density of the finished board will thus be dependent on the thickness of the wet mat before pressing to the required thickness. The density of the finished board will be in the range of from 20–65 pounds per cubic foot, and preferably in the range of 45–55 pounds per cubic foot. To achieve densities in this range, utilizing the pressures described above, the wet mat thickness before pressing will generally be in the range of 1¼ inches to 5 inches.

When a mat of the described formulation has been cured under the described conditions, a tough, strong, hardboard, or semi-hardboard will result having the density desired. The board resists moisture and rot and serves as an excellent siding for building construction.

The attached drawing illustrates a flow diagram of the process.

The following examples illustrate several embodiments of the invention. All parts are by weight unless otherwise stated.

*Example 1*

Into 44,316 parts of water were placed 908 parts of cottonwood and willow fibers which had been prepared by a cold caustic treatment of the chips, followed by disk refining to an Oliver freeness of 20 seconds. There was then added 136 parts of portland cement with agitation. The slurry was added to a fiberboard sheet mold measuring 14 inches by 14 inches, the wet mat having a thickness of 3 inches. The mat contained about 70% by weight water.

A total pressure of 10 tons was then applied to the wet mat, reducing the thickness of ⅝ inch. The platens were heated electrically to produce a temperature of 420° F. in the mat. These conditions were maintained for 20 minutes. The pressure was released and, on cooling, the resulting board measuring 14 inches by 14 inches by ⅝ inch in thickness had a density of 40 pounds per cubic foot and was a good, rigid, strong, water-resistant hardboard.

*Example 2*

Into 34,500 parts water was added 690 parts wood fiber (groundwood, Oliver freeness of 40 seconds) followed by 34.5 parts portland cement and 50 parts of butadiene-styrene copolymer latex containing 40% solids. After agitation and wet mat formation as in Example 1, the mat was subjected to 10 tons of pressure for 20 minutes at 420° F. and then 80 tons of pressure for an additional 12 minutes at 420° F.

The resulting board was ½ inch thick and was tough and strong.

*Example 3*

Example 1 was repeated except there was used 227 parts of portland cement. All other conditions were the same. The resulting board was tough and strong and had a density of 45 pounds per cubic foot.

*Example 4*

Into 88,700 parts water was added 1,800 parts willow fiber prepared as in Example 1 followed by 36 parts papermaker's alum. After agitation, there was added 18 parts concentrated ammonium hydroxide followed by 54 parts of a butadiene-styrene copolymer latex containing 40% solids (FRC–2000). After agitation there was added 270 parts portland cement.

The resulting slurry was poured into the fiberboard sheet mold, covered with a screen, pressed with 10 tons for 20 minutes and then 70 tons for 9 minutes, all at 430° F.

The resulting hardboard made an excellent siding.

*Example 5*

To 88,700 parts of water was added 1,800 parts loblolly pine fiber, 135 parts extracted pine pitch resin (Vinsol) and 135 parts portland cement. After agitation, the wet mat was formed and subsequently pressed with a total preessure of 10 tons for 20 minutes at 420° F.

The resulting board was an excellent hardboard.

*Example 6*

Into 88,700 part water was added 1,800 parts loblolly pine fiber and 540 parts portland cement. After agitation, wet mat formation, and pressing at 450° F. and 20 tons for 12 minutes, the pressure was increased to 70 tons for an additional 8 minutes, maintaining the 450° F. temperature.

The resulting board was tough, strong, moisture-resistant, and made an excellent siding.

We claim:

1. In the process of forming a hardboard consisting essentially of mixing wood fibers, 5%–25% by weight portland cement based on the weight of the finished hardboard, and water to form a slurry, forming from the slurry a wet fibrous mat having the cement distributed therethrough, and curing the mat, the improved process of curing the wet mat which comprises heating said mat containing 60%–80% water to a temperature in the range of about 350°–475° F. while pressing said mat to a pressure in the range of about 800–40,000 pounds per square inch, and maintaining said temperature and pressure ranges for a period of time of about 12–40 minutes.

2. A process according to claim 1 wherein said temperature is in the range of 400°–450° F.

3. A process according to claim 1 wherein the pressure is in the range of about 20,000–30,000 pounds per square inch.

4. A process according to claim 1 in which the slurry used to form the wet mat contains 0.5–4% by weight of a synthetic rubber latex.

5. A process according to claim 1 in which the slurry used to form the wet mat contains 2%–10% by weight of a resin binder.

6. A process according to claim 1 wherein said portland cement is present in the resulting cured hardboard in an amount in the range of about 10%–15% by weight.

References Cited

UNITED STATES PATENTS 2,037,522  4/1936  Lundback  162—225 X
2,156,311  5/1939  Schuh  162—181 X

FOREIGN PATENTS 527,857  10/1940  Great Britain.

S. LEON BASHORE, *Primary Examiner.*

U.S. Cl. X.R.

162—169, 165, 181, 225; 106—93; 264—333